United States Patent [19]

Hauff

[11] Patent Number: 4,646,486

[45] Date of Patent: Mar. 3, 1987

[54] FLAME-RETARDING WALL FEEDTHROUGH FITTING

[76] Inventor: Werner Hauff, Herlsbühlstr.19, 7925 Dischingen-Ballmertshofen, Fed. Rep. of Germany

[21] Appl. No.: 704,703

[22] Filed: Feb. 25, 1985

[30] Foreign Application Priority Data

Feb. 28, 1984 [DE] Fed. Rep. of Germany ....... 3407187

[51] Int. Cl.$^4$ .......................... E04B 5/48; E04C 2/00
[52] U.S. Cl. .......................................... 52/1; 52/220; 52/232; 411/383; 411/369; 411/901; 174/48; 174/151; 169/54
[58] Field of Search .............................. 52/1, 232, 220; 252/609; 411/378, 383, 396, 900, 901, 904, 369; 174/151, 48; 169/54, 56; 277/12

[56] References Cited

U.S. PATENT DOCUMENTS

| | | | |
|---|---|---|---|
| 3,817,204 | 6/1974 | Schittek | 411/378 |
| 4,061,344 | 12/1977 | Bradley et al. | 285/187 X |
| 4,189,619 | 2/1980 | Pedlow | 174/48 |
| 4,249,353 | 2/1981 | Berry | 52/232 |
| 4,430,470 | 2/1984 | Taniguchi et al. | 252/609 |

FOREIGN PATENT DOCUMENTS

| | | | |
|---|---|---|---|
| 0039587 | 11/1981 | European Pat. Off. | 52/232 |
| 958671 | 2/1957 | Fed. Rep. of Germany | |
| 2834189 | 2/1980 | Fed. Rep. of Germany | 52/1 |

*Primary Examiner*—Henry E. Raduazo
*Assistant Examiner*—John Malcolm White
*Attorney, Agent, or Firm*—Karl F. Ross; Herbert Dubno

[57] ABSTRACT

A feedthrough assembly for conduits basically has a wall formed with a throughgoing passage extending along an axis and having a radially inwardly directed wall surface. At least one conduit passes axially through the passage. A lining member in the passage receives at least one elastomeric adapter member having an outer surface complementarily radially outwardly engaging the wall surface and an inner surface snugly surrounding and engaging the conduit. A tightening unit has a tightening member that presses the inner and outer surfaces of the adapter member sealingly against the respective conduit and wall surface. One of the members is formed with at least one hollow chamber open radially inward at its inner surface and a mass of material generally fills the chamber. This material reacts endogenetically and emits a fire-inhibiting gas when heated substantially. The bulk of the fire-retarding material is provided in the adapter block. The chamber is formed by an axially inwardly open pocket and a plug axially inwardly closing the pocket. More particularly the block is then formed with a relatively narrow slot extending between its inner surface and the chamber. The chamber opens via the slot radially at the inner surface. The block can be formed with a plurality of such chambers and slots spaced angularly around the axis. The inner surface of the block is formed with a radially inwardly open circumferential groove crossing and interconnecting the slots.

15 Claims, 6 Drawing Figures

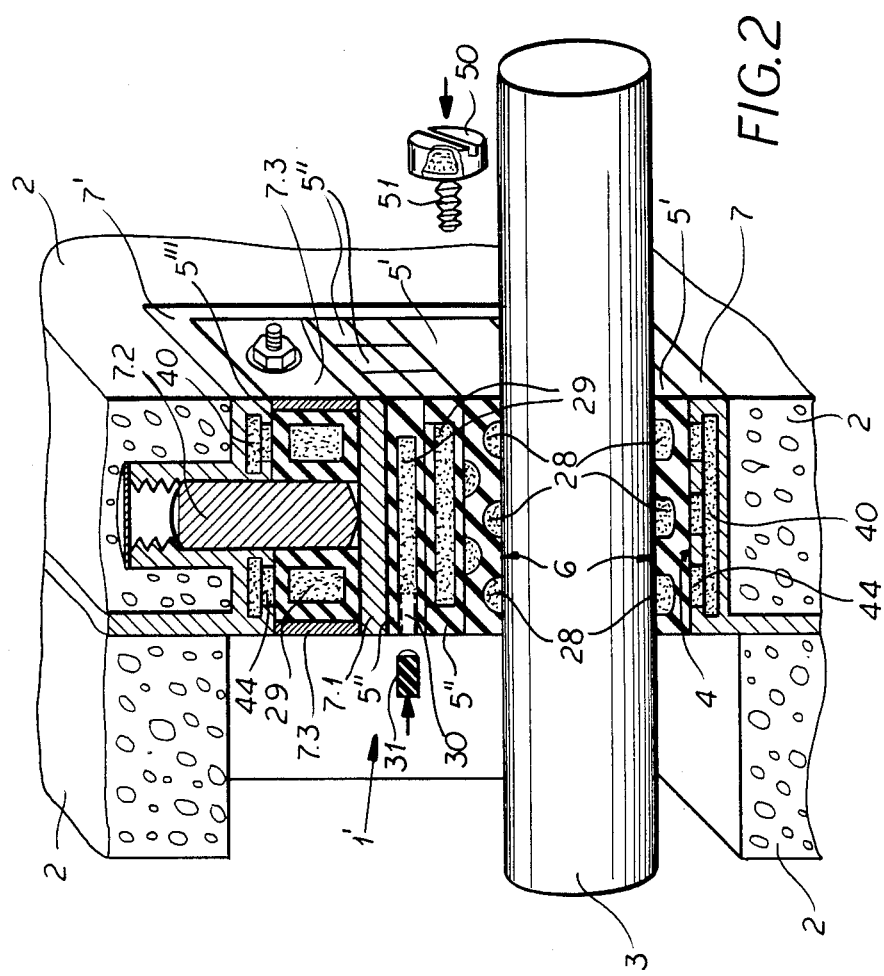

FLAME-RETARDING WALL FEEDTHROUGH FITTING

FIELD OF THE INVENTION

The present invention relates to a wall feedthrough assembly that allows a conduit—cable, pipe, hose—to pass hermetically through a wall. More particularly this invention concerns such an assembly that stops or retards fire in and along the conduit.

BACKGROUND OF THE INVENTION

In concrete and steel firecode construction it is necessary to completely block a passage through a wall that is provided to allow conduits—pipes, wires, and the like—to pass through the wall, in order that smoke, flame, and vapors generated in a fire cannot traverse the wall. Simply packing the opening around the conduits with a fireproof substance such as gypsum concrete is possible when the installation is permanent and to be sealed, but such a procedure is unacceptable in much construction where, for instance, utility chases must be capable of accepting additional conduits or must allow removal or replacement of some of the existing ones.

Such a feedthrough assembly normally is formed of the wall with the passage that extends along an axis and has a radially inwardly directed wall. At least one conduit passes axially through the passage. At least one elastomeric adapter block has an outer surface complementarily radially outwardly engaging the wall and an inner surface snugly surrounding and engaging the conduit. A tightening element presses the inner and outer surfaces of the block sealingly against the respective conduit and pushes and therefore forces the block sealingly against the conduit and passage portion.

As described in German patent No. 958,671 filed by N. Brattberg with a claim to a Swedish priority of Oct. 6, 1952 a rectangular and L-section metal frame is imbedded in a concrete wall or welded into a steel one. The rectangular opening defined by this frame is filled by a plurality of two-piece adapter blocks that are of rectangular or square outer shape with sides parallel to the normally upright sides of the frame opening, and central holes that are, for instance, cylindrical to conform to the outer surfaces of the conduits that pass through them. Solid blocks are used in locations where no conduits are provided. These adapter blocks fit snugly together to form a solid group against the horizontal lower side of the frame opening and between the two flanking upright sides once the conduits are installed. A screw-type tightening arrangement and/or a plurality of elastic shims are wedged between the horizontal upper side of the frame opening and the group of adapter blocks, compressing them together so they seal tightly. In addition this biasing system fills the remainder of the cross section of the passage. The adapter blocks are split along horizontal planes that run perpendicular to the direction they are compressed in, so that such compression effectively seals them to one another and to the respective conduits.

In my copending patent application Ser. No. 06/612,297, the passage has an outwardly flared frustoconical portion and the outer surface of the adapter block or blocks complementarily radially outwardly engages the passage portion while its inner surface snugly surrounds and engages the conduit. The tightening element is a ring engaging axially inwardly against the block in a direction opposite the flare of the frustoconical portion and pushing the block axially inward and therefore forcing the block sealingly against the conduit and passage portion.

In order to increase the effectiveness of such arrangements it is known to mix aluminum hydroxide (alumina trihydrate, $Al[OH]_3$) with the neoprene or chloroprene elastomer that makes up the adapter blocks. When heated, this material becomes $Al_2O_3$ and water ($H_2O$) in an endogenic or heat-absorbing reaction. Thus this conversion absorbs heat from the area while generating steam that displaces the local oxygen, for a dual extinguishing action. As a result such a fitting not only blocks fire from passing through it, as well of course as any vapor or liquid, but also actively participates in controlling or even extinguishing the fire. In the case of a cable feedthrough, the retardant action counteracts the tendency of the insulation of the cable to burn, thereby effectively stopping the fire right at the fire wall. As a result the overall fire rating, as time for burn-through, is increased, allowing a short fire-retardant fitting to have the same rating as a long fire-stop fitting, with a consequential saving on manufacturing costs and, in particular, molds.

It is unfortunately impossible to incorporate much of the $Al(OH)_3$ in the elastomer blocks. No matter how much is originally mixed with the material, most is lost during treatment, particular vulcanizing, of the fitting block. What is more the additive is a particularly gritty powder that must be worked and mixed with special machines. Even substituting some agent that generates foam for the powder entails a substantial loss of active material during subsequent heat-treatment of the adapter block.

OBJECTS OF THE INVENTION

It is therefore an object of the present invention to provide an improved fire-retardant wall feedthrough fitting.

Another object is the provision of such a fire-retardant wall feedthrough fitting which overcomes the above-given disadvantages, that is which has a considerable fire-retardant effectiveness while being relatively simple and inexpensive to manufacture.

SUMMARY OF THE INVENTION

A feedthrough assembly for conduits basically has a wall formed with a throughgoing passage extending along an axis and having a radially inwardly directed wall surface. At least one conduit passes axially through the passage. A lining member in the passage receives at least one elastomeric adapter member having an outer surface complementarily radially outwardly engaging the wall surface and an inner surface snugly surrounding and engaging the conduit. A tightening unit has a tightening member that presses the inner and outer surfaces of the adapter member sealingly against the respective conduit and wall surface. One of the members according to this invention is formed with at least one hollow chamber open radially inward at its inner surface and a mass of material generally fills the chamber. This material reacts endogenetically and emits a fire-inhibiting gas when heated substantially.

With this arrangement, therefore, the block can be manufactured and vulcanized at high temperature. Once cooled to ambient temperature, the material, typically a powder of alumina trihydrate, is filled into the chamber. It is therefore possible to use high-quality elastomers that are easy to work. Since the block is partly hollow, it can be made with minimal resin, for a correspondingly reduced manufacture cost.

The fire-snuffing effect will be focused directly where needed. In addition the chambers can be formed in the lining, block, and tightening ring, so that if the fitting is subjected to a long burn it will be able to withstand burning through, with the chambers one after the other being effective.

Normally according to this invention the bulk of the fire-retarding material is provided in the adapter block. The chamber can be open also radially outward, the adapter block in effect being alternate layers of an elastomer and the material. The adapter block may be of chloroprene rubber and the mass a mixture of the material with rubber. Rivets secure the layers axially together. Thus in this arrangement the chamber is open axially inward of the wall.

Typically the chamber is formed by an axially inwardly open pocket and a plug axially inwardly closing the pocket. More particularly the block is then formed with a relatively narrow slot extending between its inner surface and the chamber. The chamber opens via the slot radially at the inner surface. The block can be formed with a plurality of such chambers and slots spaced angularly around the axis. The inner surface of the block is formed with a radially inwardly open circumferential groove crossing and interconnecting the slots.

According to another feature of this invention the chamber is formed by a radially inwardly open groove formed in the inner surface of the block. In addition an imperforate adapter block in addition to the first-mentioned block is engaged between the first block and the passage. This second block is formed with another such chamber opening toward the adapter block and filled with the material.

In accordance with a further invention feature the wall is provided with a lining surrounding the adapter block and formed with an annular chamber opening radially inward against the block. The material generally fills this annular chamber. The liner is formed with a plurality of radially extending and angularly spaced slots extending from the annular chamber to the outer surface of the block.

The instant invention also proposes the use of a flame-retarding unit comprising a capsule forming at least one hollow chamber open radially inward at its inner surface, a mass of material generally filling the chamber, the material reacting endogenetically and emitting a fire-inhibiting gas when heated substantially, and means for securing the capsule to one of the members. In the simplest arrangement the means is a self-tapping screw having a hollow head forming the capsule and this screw is engaged in the adapter member.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIGS. 1 and 2 are partly perspective axial sections through wall feedthrough assemblies according to this invention;

SPECIFIC DESCRIPTION

Figure 1:
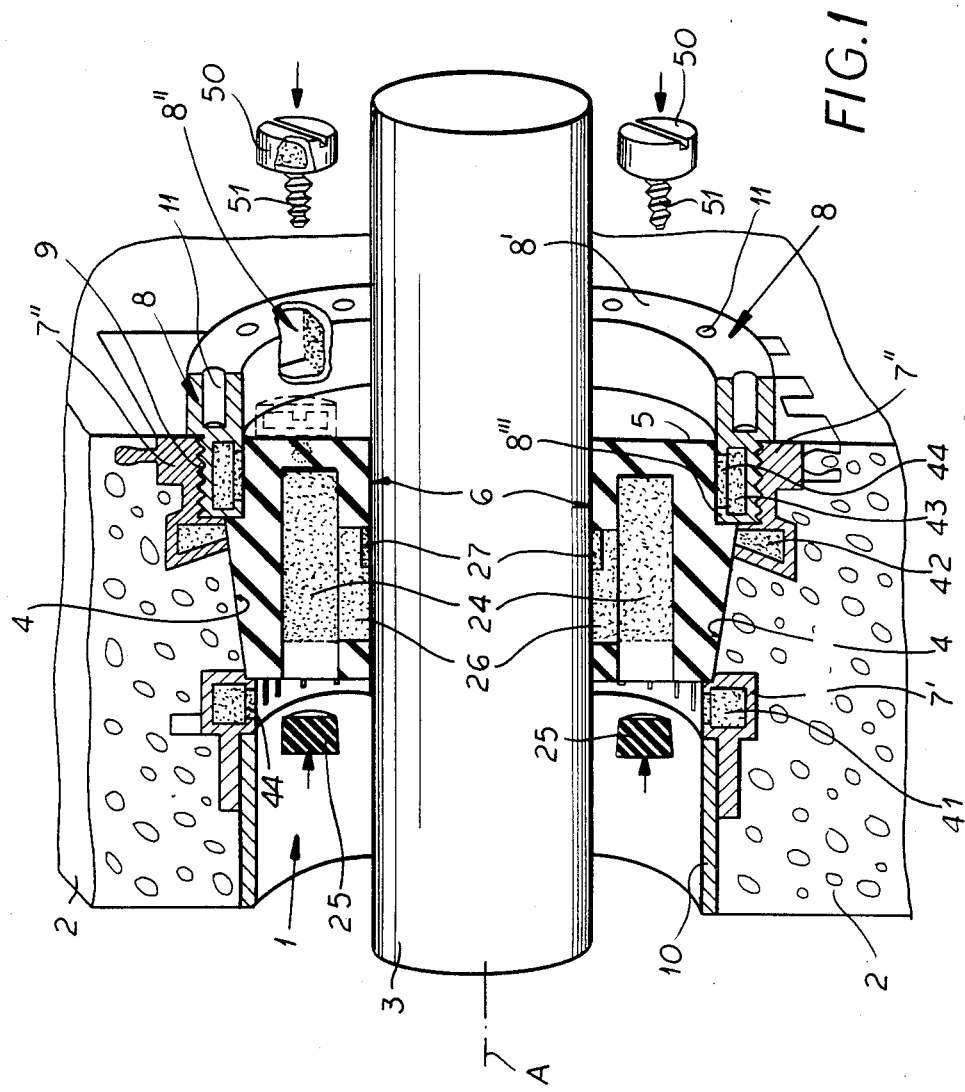

As seen in FIG. 1 a wall feedthrough assembly includes a masonry wall 2 formed with a throughgoing passage 1 having a frustoconical inner surface 4 centered on an axis A. A cable 3 generally also centered on the axis A passes through the passage 1 from the outside on the right as seen in the drawing to the inside on the left. This cable or conduit 3 fits snugly through a passage 6 of an adapter block 5 having an outer surface complementary to the wall surface 4.

The passage 1 is provided with a liner 7', 7" having an inner part 7' and an outer part 7" axially flanking the surface 4. The inner end of the tapered block 5 axially engages the inner part 7' which is fitted at the end of a liner tube 10. A tightening ring 8 has an outer part 8' projecting axially outward from the wall 2 and formed with cells 8" and an inner part 8''' joined at a screwthread 9 to the inner periphery of the outer lining ring 7". The inner part 8''' bears axially inward against the tapered adapter block 5. The outer part 8' is also formed with axially outwardly open blind holes 11 that can interfit with an appropriate key or wrench. Thus this ring 8 can be tightened on the block 5 in the manner described above with respect to my earlier patent application to thoroughly seal the passage 1 around the conduit 3.

According to this invention the adapter block 5 is formed with a plurality of chamber-forming axially inwardly open material-filled pockets or chambers 24 that are axially inwardly sealed by respective plugs 25 shown removed in FIG. 1. These chambers 24, which are identical and angularly equispaced about the axis A, open via respective narrow radial slots 26 at the inner surface at the bore 6, and the block 5 is formed at these slots 26 with a radially inwardly open groove 27 that interconnects them.

These chambers 24 are filled with alumina trihydrate which, when heated, breaks down to $Al_2O_3 . H_2O$ in a reaction that consumes heat, the water being in the form of steam. Thus in the event of a fire, this material will on the one hand cool the cable 3, but will also emit steam that will displace oxygen and further aid in extinguishing the fire.

In accordance with further features of the invention the inner and outer lining parts 7' and 7" are formed with annular passages 41 and 42 opening radially inward, the former via slots 44 and the latter directly. In addition the inner ring part 8''' is formed with a chamber 43 similarly opening radially inward by slots 44, and the cells of the part 8" may also be filled with the fire-retarding material.

It is also possible to screw capsules 50 formed as the heads of self-tapping screws 51 into the adapter block 5, these heads 50 being filled with the fire retarding material. Such a unit 50, 51 can be retrofitted to an existing feedthrough assembly for additional fire protection.

In FIG. 2 the passage 1' is square and has a lining frame 7' in which imperforate adapter and filler blocks 5' are provided along with a perforate block 5'. The latter is formed with radially inwardly and outwardly open material-filled grooves 28, and the former with chambers 29 having ends 30 closed inwardly by plugs 31. Further imperforate filler blocks 5''' engaged between axial pressure plates 7.3 and between the frame 7' and a plate 7.1 pressed radially by a screw 7.2 against the blocks 4" are formed with annular material-filled chambers 29. In addition the lining frame 7' is formed with annular compartments 41 opening via such slots 44 against the blocks 5' and 5'''.

Figure 3:
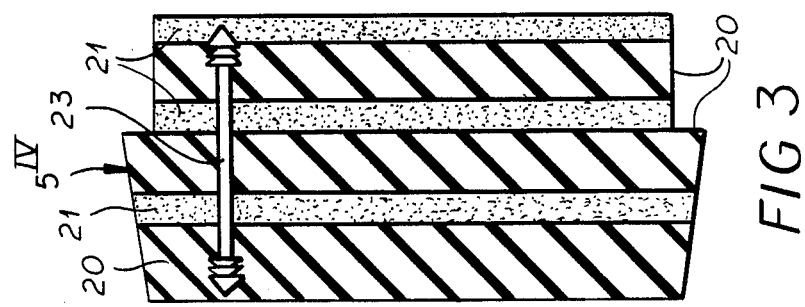
FIG. 3 is a section through a filler block of an assembly in accordance with the present invention.

The block $5^{iv}$ of FIG. 3 is formed of layers 20 of an elastomer and alternate layers 21 of the fire-retardant material, made stable by mixing the elastomer in with the material. Nails or rivets 23 secure this laminate together, and the fire-retardant layer 21 is left exposed on its inside axial face.

Figure 6:
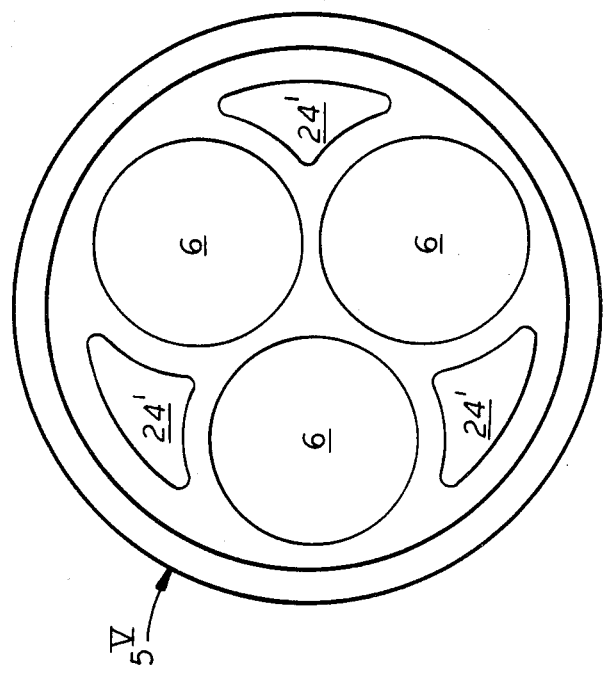
FIG. 6 is a end view like FIG. 4 of another adapter ring in accordance with the invention.

FIG. 6 shows how three such bores 6' can be formed in an otherwise circular block $5^v$ formed with three similar material chambers 24'. The web thickness between bores 6' and chambers 24' is kept fairly uniform so the block $5^v$ can be vulcanized rapidly and at high temperature before the chambers 24' are filled.

Figure 5:
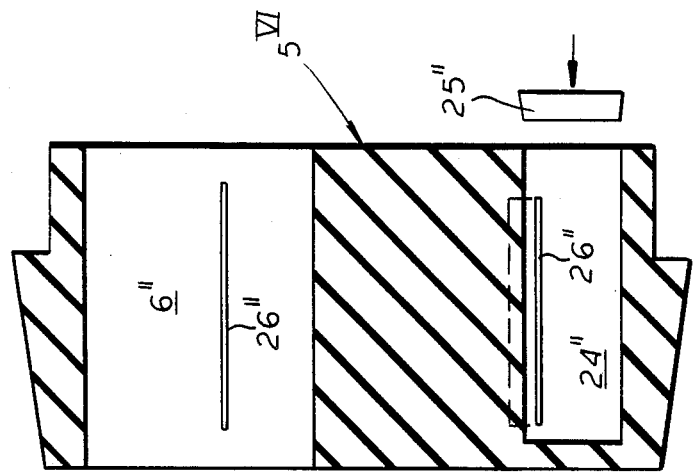
FIG. 5 is an axial section taken along line V—V of FIG. 4.
Figure 4:
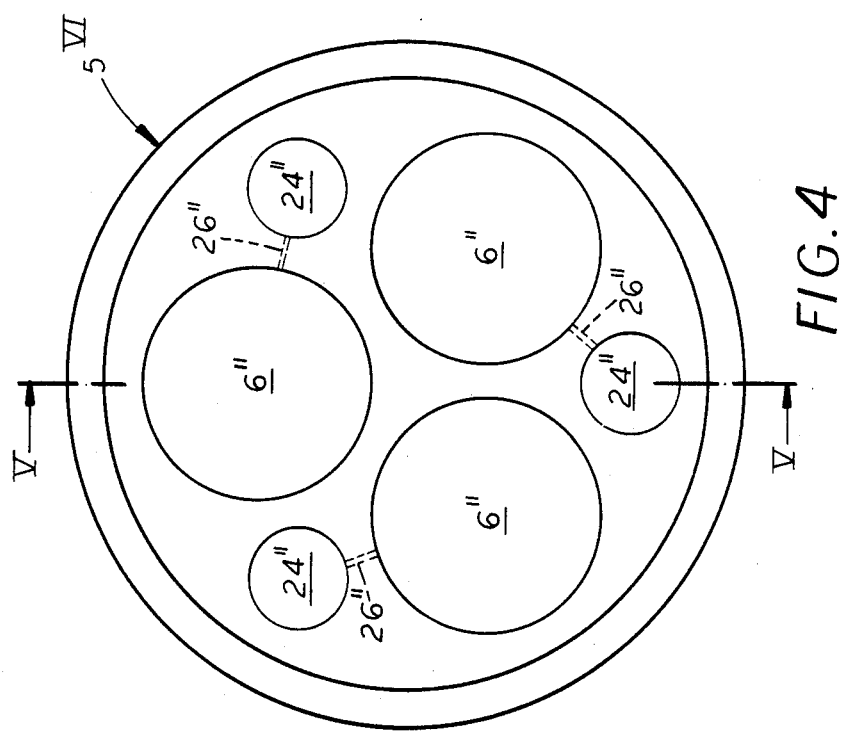
FIG. 4 is an end view of an adapter ring of an assembly of the invention.

In FIGS. 4 and 5 a block $5^{vi}$ is shown with cylindrical bores 6" and chambers 24" interconnected by nonradial slots 26". Plugs 25" inwardly close the chambers 24".

With the system of this invention it is therefore possible to provide a good quantity of the fire-snuffing material in the fitting. Thus a fire moving along a polyvinylchloride cable will normally be put out when it hits the fitting.

I claim:

1. A feedthrough assembly for conduits, the assembly comprising:
   a wall having an inside and an outside, formed therebetween with a throughgoing passage extending along an axis, and having a radially inwardly directed wall surface, whereby at least one conduit passes axially through the passage;
   at least one elastomeric adapter block having an outer surface complementarily radially outwardly engaging the wall surface and an inner surface snugly surrounding and engaging the conduit, the block being formed with at least one hollow chamber open radially inward at the inner surface of the block, and formed by an axially inwardly open but axially outwardly closed pocket;
   a plug separate from the block and axially inwardly closing the pocket;
   a mass of material generally filling the chamber axially outward of the plug, the material reacting endogenetically and emitting a fire-inhibiting gas when heated substantially; and
   tightening means including a tightening element for pressing the inner and outer surfaces of the block sealingly inward and outward against the respective conduit and wall surface.

2. The feedthrough assembly defined in claim 1 wherein the material is alumina trihydrate.

3. The feedthrough assembly defined in claim 1 wherein the chamber is formed by a radially inwardly open groove formed in the inner surface of the block.

4. The feedthrough assembly defined in claim 1 wherein the chamber is open also radially outward, the adapter block in effect being alternate layers of an elastomer and the material.

5. The feedthrough assembly defined in claim 4 wherein the adapter block is of chloroprene rubber and the mass is a mixture of the material with rubber, the block further comprising
   rivets securing the layers axially together.

6. The feedthrough assembly defined in claim 5 wherein the chamber is open axially inward of the wall.

7. The feedthrough assembly defined in claim 1 wherein the block is formed with a relatively narrow slot extending between its inner surface and the chamber, the chamber opening via the slot radially at the inner surface.

8. The feedthrough assembly defined in claim 7 wherein the block is formed with a plurality of such chambers and slots spaced angularly around the axis.

9. The feedthrough assembly defined in claim 8 wherein the inner surface of the block is formed with a radially inwardly open circumferential groove crossing and interconnecting the slots.

10. A feedthrough assembly for conduits, the assembly comprising:
    a wall formed with a throughgoing passage extending along an axis and having a radially inwardly directed wall surface, whereby at least one conduit passes axially through the passage;
    at least one elastomeric adapter block having an outer surface complementarily radially outwardly engaging the wall surface and an inner surface snugly surrounding and engaging the conduit, the block being formed with at least one hollow chamber open radially inward at its inner surface;
    a mass of material generally filling the chamber, the material reacting endogenetically and emitting a fire-inhibiting gas when heated substantially;
    tightening means including a tightening element for pressing the inner and outer surfaces of the block sealingly against the respective conduit and wall surface; and
    an imperforate adapter block 7" in addition to the first-mentioned block and engaged between the first block and the passage, the second block being formed with another such chamber opening toward the adapter block and filled with the material.

11. A feedthrough assembly for conduits, the assembly comprising:
    a wall formed with a throughgoing passage extending along an axis and having a radially inwardly directed wall surface, whereby at least one conduit passes axially through the passage;
    at least one elastomeric adapter block having an outer surface complementarily radially outwardly engaging the wall surface and an inner surface snugly surrounding and engaging the conduit, the block being formed with at least one hollow chamber open radially inward at its inner surface;
    a mass of material generally filling the chamber, the material reacting endogenetically and emitting a fire-inhibiting gas when heated substantially; and
    tightening means including a tightening element for pressing the inner and outer surfaces of the block sealingly against the respective conduit and wall surface, the wall being provided with a liner surrounding the adapter block and formed with an annular chamber opening radially inward against the block, the material generally filling the annular chamber.

12. The feedthrough assembly defined in claim 11 wherein the liner is formed with a plurality of radially extending and angularly spaced slots extending from the annular chamber to the outer surface of the block.

13. A feedthrough assembly for conduits, the assembly comprising:

a wall formed with a throughgoing passage extending along an axis and having a radially inwardly directed wall surface, whereby at least one conduit passes axially through the passage;

at least one elastomeric adapter block having an outer surface complementarily radially outwardly engaging the wall surface and an inner surface snugly surrounding and engaging the conduit, the block being formed with at least one hollow chamber open radially inward at its inner surface;

a mass of material generally filling the chamber, the material reacting endogenetically and emitting a fire-inhibiting gas when heated substantially; and tightening means including a tightening element for pressing the inner and outer surfaces of the block sealingly against the respective conduit and wall surface, the tightening element being formed with an annular chamber generally filled with the material and opening axially against the block.

14. In combination with a feedthrough assembly comprising:

a wall having an inside and an outside and formed with a throughgoing passage extending therebetween along an axis and having a radially inwardly directed wall surface, whereby at least one conduit passes axially through the passage;

a lining member in the passage;

at least one elastomeric adapter member having an outer surface complementarily radially outwardly engaging the wall surface, an inner surface snugly surrounding and engaging the conduit, and an inside end toward the inside and an outside end exposed at the outside of the wall;

tightening means including a tightening member for pressing the inner and outer surfaces of the adapter member sealingly against the respective conduit and wall surface; a flame-retarding unit comprising:

a capsule forming at least one hollow chamber;

a mass of material generally filling the chamber, the material reacting endogenetically and emitting a fire-inhibiting gas when heated substantially; and means for securing the capsule to the outside end of the adapter member.

15. The combination defined in claim 14 wherein the means is a self-tapping screw having a hollow head forming the capsule, the screw being engaged in the adapter member.

* * * * *